US007146701B2

(12) United States Patent
Mahoney et al.

(10) Patent No.: US 7,146,701 B2
(45) Date of Patent: Dec. 12, 2006

(54) CONTROL HOUSING AND METHOD OF MANUFACTURING SAME

(75) Inventors: Michael R. Mahoney, Lake St. Louis, MO (US); L. Nicholas Nibert, St. Peters, MO (US); David M. Linhoff, St. Peters, MO (US)

(73) Assignee: Neeco-Tron, Inc., St. Peters, MO (US)

(*) Notice: Subject to any disclaimer, the term of this patent is extended or adjusted under 35 U.S.C. 154(b) by 0 days.

(21) Appl. No.: 11/238,519

(22) Filed: Sep. 29, 2005

(65) Prior Publication Data

US 2006/0021860 A1 Feb. 2, 2006

Related U.S. Application Data

(62) Division of application No. 10/355,507, filed on Jan. 31, 2003.

(51) Int. Cl.
*B23P 25/00* (2006.01)
*H01H 1/10* (2006.01)

(52) U.S. Cl. ......................... 29/458; 29/469; 29/527.1; 200/512; 200/513

(58) Field of Classification Search ................ 200/5 A, 200/293, 302.1, 302.2, 341, 512, 513, 514, 200/515, 516, 517, 518, 519, 520; 29/458, 29/469, 527.1, 527.2
See application file for complete search history.

(56) References Cited

U.S. PATENT DOCUMENTS

| | | | | |
|---|---|---|---|---|
| 4,005,299 | A * | 1/1977 | Keough | 200/516 |
| 4,555,601 | A | 11/1985 | Taguchi | |
| 4,620,075 | A | 10/1986 | La Belle et al. | |
| 4,639,559 | A | 1/1987 | Taguchi | |
| 4,818,827 | A | 4/1989 | Ipcinski et al. | |
| 4,836,256 | A | 6/1989 | Meliconi | |
| 5,166,868 | A * | 11/1992 | Stanton et al. | 361/814 |
| 5,219,067 | A * | 6/1993 | Lima et al. | 200/302.2 |
| 5,305,980 | A * | 4/1994 | Le Blanc | 248/309.1 |
| 5,357,065 | A * | 10/1994 | Mitamura et al. | 200/5 A |
| 5,430,266 | A * | 7/1995 | Austin et al. | 200/302.1 |
| RE35,182 | E | 3/1996 | Howard | |
| 5,579,002 | A * | 11/1996 | Iggulden et al. | 341/23 |
| 5,668,357 | A * | 9/1997 | Takiguchi et al. | 200/5 R |
| 5,681,122 | A * | 10/1997 | Burke | 400/472 |
| 5,798,715 | A * | 8/1998 | Saperstone | 341/22 |
| 5,812,085 | A * | 9/1998 | Barraza et al. | 341/176 |

(Continued)

FOREIGN PATENT DOCUMENTS

JP 401296517 A 11/1989

(Continued)

*Primary Examiner*—Essama Omgba
(74) *Attorney, Agent, or Firm*—Polster, Lieder, Woodruff & Lucchesi

(57) ABSTRACT

A control housing is provided which encases a control board. The housing has a cover and a backing which are fixed together to secure the control board within the housing. The control board includes a plurality of switches, and the housing includes a plurality of corresponding buttons to activate the switches. The cover includes a cover surface having at least one button hole in register with the control board switch; operating insignia integrally formed on the cover surface adjacent the button hole; and a membrane which closes said button hole to form a button surface. The insignia is exposed through the membrane to be exposed and visible. The membrane is fused to the cover, thereby providing a housing which is sealed to substantially prevent gases, liquids or solids from entering the housing.

7 Claims, 11 Drawing Sheets

U.S. PATENT DOCUMENTS

| | | | | |
|---|---|---|---|---|
| 6,050,407 | A | 4/2000 | Trujillo | |
| 6,080,940 | A * | 6/2000 | Rice | 200/5 A |
| 6,106,576 | A * | 8/2000 | Fromson | 318/16 |
| 6,180,895 | B1 * | 1/2001 | Hutchinson et al. | 200/5 A |
| 6,207,912 | B1 | 3/2001 | Persson | |
| 6,321,441 | B1 | 11/2001 | Davidson et al. | |
| 6,355,890 | B1 | 3/2002 | Kuroda | |
| 6,383,604 | B1 | 5/2002 | Yoo et al. | |
| 6,462,294 | B1 | 10/2002 | Davidson et al. | |
| 6,488,425 | B1 * | 12/2002 | Spence et al. | 400/714 |
| 6,571,457 | B1 * | 6/2003 | Naritomi | 29/622 |
| 6,613,994 | B1 | 9/2003 | Bauer et al. | |
| 6,621,027 | B1 * | 9/2003 | Shimizu et al. | 200/341 |
| 6,672,623 | B1 | 1/2004 | Patton et al. | |
| 6,700,086 | B1 | 3/2004 | Serizawa et al. | |
| 6,750,407 | B1 * | 6/2004 | Song et al. | 200/5 A |
| 6,750,414 | B1 | 6/2004 | Sullivan | |
| 6,794,588 | B1 * | 9/2004 | Lin | 200/5 A |
| 6,853,308 | B1 * | 2/2005 | Dustin | 340/825.69 |
| 2003/0150699 | A1 * | 8/2003 | Song et al. | 200/5 A |
| 2003/0213683 | A1 * | 11/2003 | Shimizu et al. | 200/341 |
| 2005/0002170 | A1 * | 1/2005 | Jacobs et al. | 362/23 |

FOREIGN PATENT DOCUMENTS

| | | |
|---|---|---|
| JP | 11288632 A * | 10/1999 |

* cited by examiner

CONTROL HOUSING AND METHOD OF MANUFACTURING SAME

CROSS-REFERENCE TO RELATED APPLICATIONS

This is a divisional application of co-pending application Ser. No. 10/355,507, filed Jan. 31, 2003 and which is incorporated herein by reference.

STATEMENT REGARDING FEDERALLY SPONSORED RESEARCH OR DEVELOPMENT

Not Applicable.

BACKGROUND OF THE INVENTION

This invention relates to control housings (commonly referred to as pendants) which house control boards used to control equipment, such as hospital beds or other electronic equipment device requiring remote control , and to a method for producing the housings to mold instructional or operating insignia directly onto the housing.

Hand held controls or pendants are commonly used in the medical field to control various types of medical equipment. One common place such pendants are used is to control the position of hospital beds. As is known, the position of a hospital bed can be changed to alter (1) the height of the bed; (2) the angle of the head of the bed; and (3) the angle of the foot of the bed. Typically, a control unit is mounted to the bed itself for use by hospital staff. However, to let the patient control the bed position, a pendant control is also provided. A bed controller generally includes three sets of buttons: one to control the bed height, one to control the angle of the head of the bed; and one to control the angle of the foot of the bed. Depending on the equipment being operated by the controller, the button arrangements will vary, and, in fact, other button arrangements are common. Current regulations require that instructional or operating insignia be applied to the pendant to inform the patient which buttons control which functions. Such insignia (or functions) can also include accessories, such as massagers, heaters, TV, radio, nurse calls, or other devices or functions it is desirable to provide for a patient. Additionally, insignia identifying the pendant manufacturer can also be included on the pendant. Currently, these insignia are printed onto the pendant. However, over time, the printed insignia wears off.

Further, current manufacturing procedures for the pendant housings result in small crevices or gaps around the pendant's buttons through which contaminants (i.e., liquids, gases, and even small solids or particulate matter) can pass and come into contact with the control board. For example, the pendant buttons often extend through openings in the front surface of the pendant. Hence, there is a slight gap between the button and the edge of the button hole through which contaminants can pass. Thus, although the pendant itself can be wiped, for example, with alcohol, to clean, disinfect, and sterilize the surface of the pendant, any contaminants that may have entered the pendant itself cannot be sterilized. When contaminants enter the pendant housing, they can affect the operation of the device being controlled if they reach the control board within the housing. Further, in a hospital setting, such contaminants can lead to cross-contamination.

Hence, it would be desirable to produce a pendant which even further reduces the possibility of contaminants from entering the housing; and which reduces the possibility of the instructional insignia from wearing off the pendant.

The current production methods for producing hospital bed controllers tend to result in controllers which are fairly thick. For example, a typical bed controller is about 1"–2" thick. It would be desirable to produce a controller which is thinner. A thinner controller is lighter, and can also be easier for certain patients to hold and use (i.e., the patient will be able to reach the buttons of the controller more easily).

BRIEF SUMMARY OF THE INVENTION

A control housing is provided which encases a control board. The housing has a cover and a backing which are fixed together to secure the control board within the housing. The control board includes a plurality of switches, and the housing includes a plurality of corresponding buttons to activate the switches. The cover includes a cover surface having at least one button hole in register with the control board switch; operating insignia integrally formed on the cover surface adjacent the button hole; and a membrane which closes said button hole to form a button surface. The insignia is exposed through the membrane to be exposed and visible. The insignia can include function insignia (i.e., what the button operates), operating insignia (i.e., arrows), and/or an identifying insignia (i.e., name, logo, etc.). The membrane is fused to the cover, thereby providing a housing which is sealed to substantially prevent gases, liquids or solids from entering the housing.

Preferably, the control housing cover comprises a frame which surrounds the cover surface and the surface is sunken relative to the frame. The membrane overlies the surface and is fused at least to an inner perimeter of the frame.

In one embodiment the cover includes a flexible arm extending into the button hole and an insignia is formed at the end of the arm. The insignia is raised relative to the arm. In this embodiment, the membrane covers the arm and surrounds the insignia such that the insignia is exposed. In this embodiment, the insignia (for example, the operating insignia) is contained within the center of the button. The cover can include a channel which receives an insignia insert. The insignia insert containing a second insignia (i.e., a function insignia) and can also include a third (identifying) insignia). The second insignia is positioned on the insert to be near the holes. The insignia insert is sized such that the second and third insignia extend above the cover body surface to be exposed and visible through the membrane. The use of the insert allows for the second and third insignia to be made from a resin of a different color than the cover or the membrane. Hence, the pendant can have two, three or more different colors.

In a variation of this embodiment, the cover comprises a cover body and a button insert (as opposed to an insignia insert) received in the cover body. The button insert comprises the cover surface in which the button holes are formed. As above, an arm extends from an edge of the button hole into the button hole, and an insignia is formed at the end of the arm to be raised relative to the cover surface. In this embodiment, the button insert also include an operating insignia adjacent the button holes in addition to the function indicia positioned within the button holes. The function indicia also is raised. The cover body can includes a panel having an upper surface on which a third (identifying) insignia can be formed. As with the first and second insignia, the third insignia is also raised. The button insert surface may be substantially flush with the panel surface.

In either of these to alternatives, the membrane is applied to the cover to fill the button hole, thereby forming a button membrane which defines the button surface. Preferably, a raised boarder is formed about the button hole. Additionally, the membrane forms a cover membrane which surrounds the buttons and the second and third insignia (if provided).

In all embodiments, the membrane housing and backing are preferably formed from a rigid plastic, and the membrane is formed from a soft, pliable plastic. The membrane is molded, in situ, on the cover body, and is applied via a process which will allow the membrane to fuse with the body plastic. By fusing the membrane to the cover body, a seal is formed between the membrane and the cover body which will substantially prevent gases, liquids, and/or solids (i.e., particulate matter) from entering the cavity which housing the control board. Further, the cover surface of the pendant is smooth. That is, it has no sharp corners which will trap particulate matter. Hence, the pendant is easily cleaned.

Different methods are also disclosed for forming the pendants.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
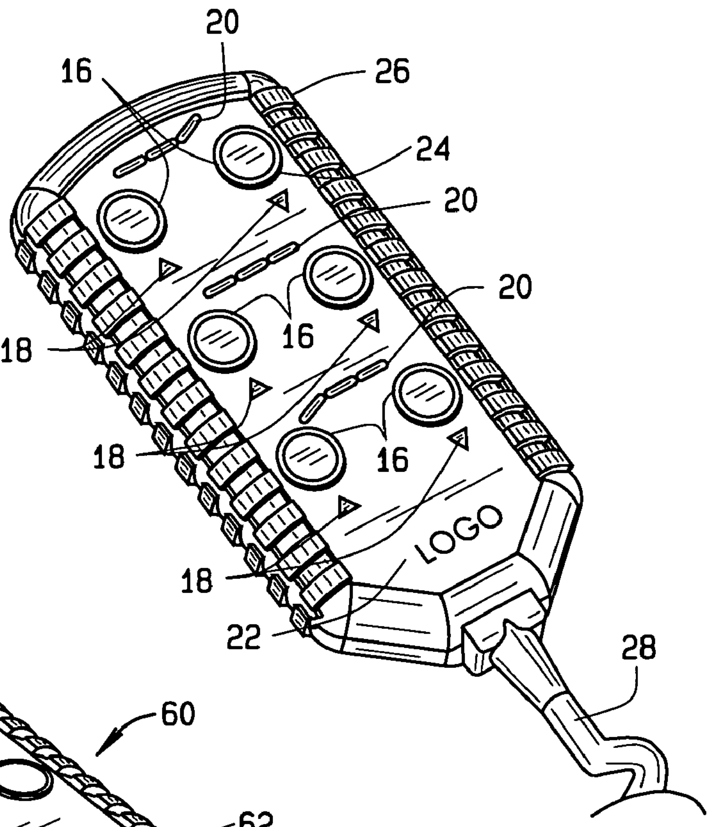
FIG. 1 is a perspective view of a first illustrative embodiment of a pendant of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
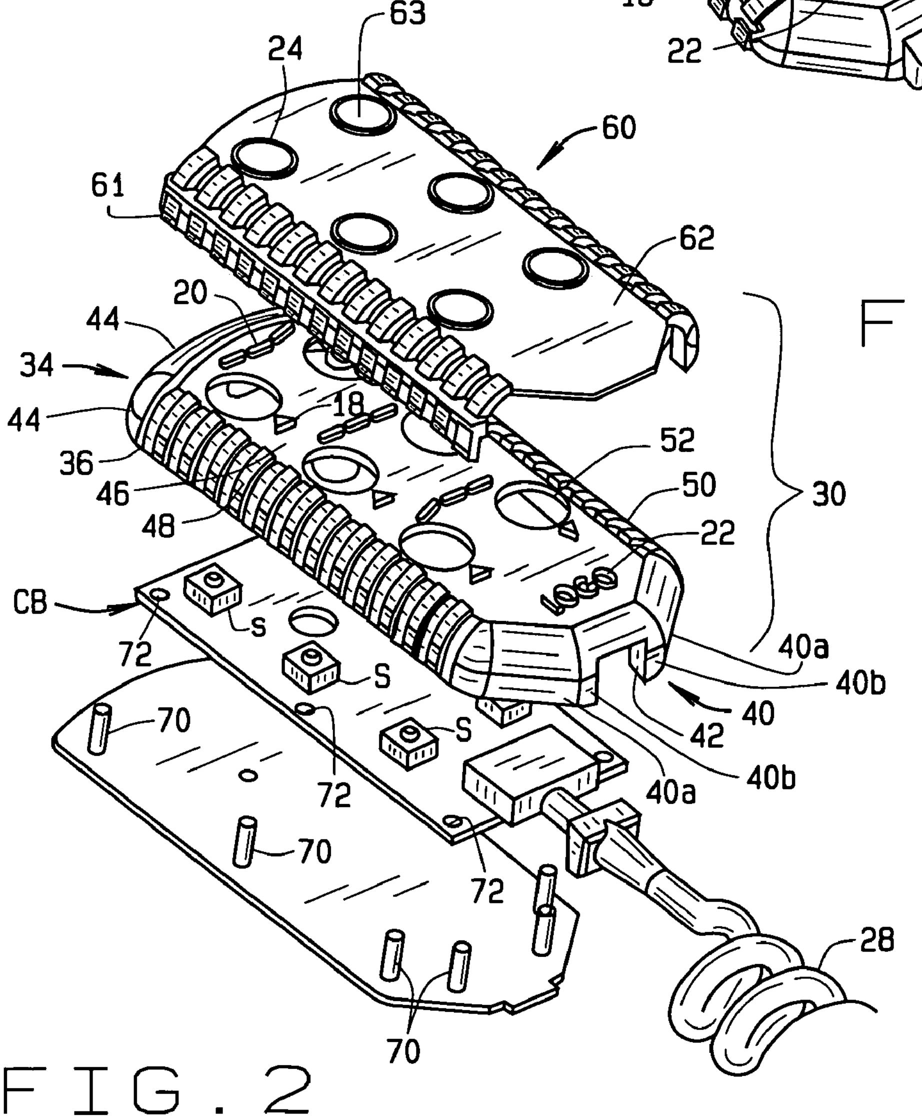
FIG. 2 is an exploded view of the pendant of FIG. 1.
Figure 3:
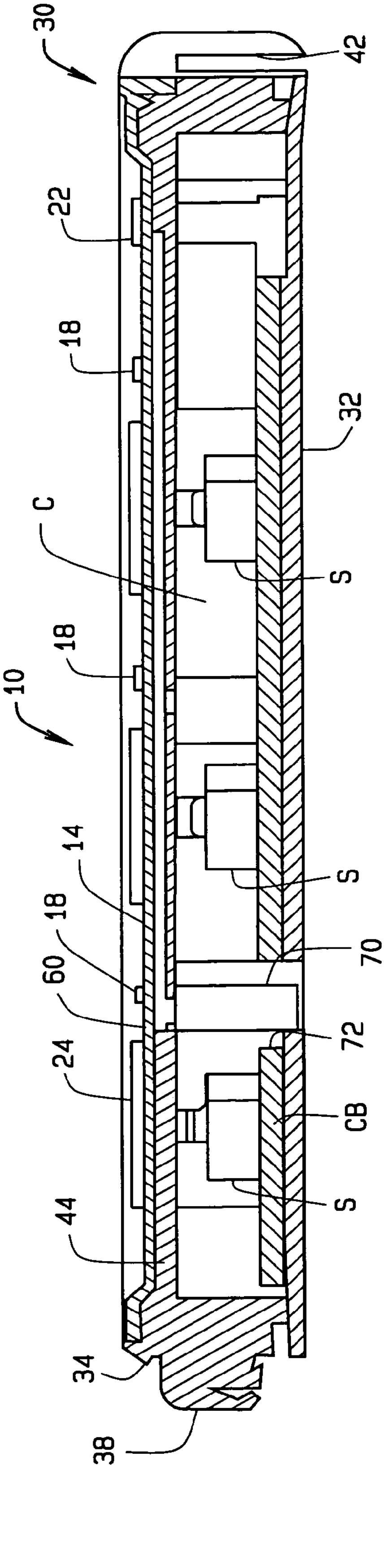
FIG. 3 is a cross-sectional view of the pendant of FIG. 2.

A first embodiment of the pendant is shown in FIGS. 1–3. The pendant 10 includes a housing 12 having a front face 14, a back, and side walls which define a cavity C (FIG. 3) in which a control board CB (FIG. 2) is mounted. The pendant includes a series of buttons 16 on the front face 14. First instructional insignia 18 in the form of up and down arrows is provided near each button 16. A second instructional insignia 20 also is provided near each set of buttons to indicate the function of the button. Illustratively, in FIG. 1, the first instructional insignia 18 is in the shape of up and down arrows and is positioned centered and below its respective button. The second instructional insignia 20 is positioned above and between its respective buttons. Thus, in the pendant shown in FIG. 1, the top set of buttons control the position or angle of the head of the bed; the middle set of buttons control the bed height; and the bottom set of buttons control the position or angle of the foot or end of the bed. As can be appreciated, the instructional insignia 18 and 20 will vary depending on the function of the button. Hence, insignia 18 need not necessarily be arrows and the insignia 20 need not necessarily indicate a bed. Further, depending on the function of the button, both of the insignia may not be needed. For example, for an on/off button, only one instructional insignia for the button is needed. Additionally, an identifying insignia 22 can be provided which, for example, includes the logo or brand name of the pendant.

The buttons 16 can include a raised rim or boarder 24 around the circumference of the button. Such a rim makes it easier, for example, to locate the buttons in dim light and for physically impaired individuals to locate the buttons. The raised button rim 24 additionally prevents inadvertent activation of the buttons 16, for example, when the unit is dropped or if something is dropped on the unit. A raised frame section 26 surrounds the front face 14 and the buttons 16. Preferably, the buttons do not extend above the top of the frame 26. Lastly, a cord 28 can extend from the bottom of the housing 12 to operatively connect the pendant 10 to, for example, the motor controls which operate motors to move the various sections of a patient bed. The cord carries wires, which as is known, serve to electrically connect the control board CB to the controlled equipment (in this case, a hospital bed) so that the buttons are operative to control the motors which alter the position of the bed. Using known technology, such as an wireless networking or infrared emitters for example, the pendant 10 can be made to be cordless (or wireless) and the cord 28 can be omitted. Other wireless technology can also be used. If the pendant is cordless, the pendant can be provided with a proximity detector which will emit a signal when the pendant has been moved more than a certain distance from the control box. Such a signal can also be a locate signal. For example, the bed can be provided with a "find" button, which when pressed causes the pendant to activate its locate signal to help a patient or hospital personnel find the pendant. It will be appreciated, that although the housing and its method of manufacture are being described with respect to a hospital bed, the control housing and its method of manufacture have broader applicability, and can be used to house virtually any type of control board to control virtually any type of equipment. For example, and without limitation, the housing of the present invention can used with controls for x-ray equipment, laboratory equipment, standard television or video devices, or any other type of equipment which includes a wired or wireless pendant control.

The housing includes a cover 30 which, as will be described, is molded in a two step operation, and a backing or bottom 32. The cover and backing, in combination, form the cavity C in which the control board CB is encased.

The cover 30 includes a rigid body 34 which is molded from a plastic such as ABS (acrylonitrile butadiene styrene). Other plastic will work as well. The body 34 includes side walls 36, a top end wall 38, and a bottom end wall 40. The end wall 40 is made with sloped sections 40*a* which are joined by a flat section 40*b*. An opening 42 is molded into the end wall section 40*b* for the end of the cord 28, and through which the cord's strain relief passes. The body 34 also includes a front surface 44 including a central section 46 and a peripheral section or frame 48. The central section 46 is sunken with respect to the peripheral section 48, and a shoulder 50 is formed between the central and peripheral sections of the front surface 44. The control board CB includes a series of switches S. The body 34 includes a series of openings 52 in the front face which align with the control board switches S. Additionally, the instructional insignia 18 and 20 and the identifying insignia 22 are molded on the front surface of the sunken central section 46 to be raised relative to the surface of the central section 46. The top of the instructional and identifying insignia are shown to be below the top surface of the peripheral frame 48. That is, the insignia 18, 20, and 22 have a height less than the height of the shoulder 50.

A cover or membrane layer 60 is formed to cover the sunken central section 46 of the front surface of the housing body 34. The layer 60 is preferably formed from a soft pliable plastic, such as a thermoplastic elastomer (or TPE). The layer 60 includes side walls 61 which extend over the side surfaces of the cover 34. As shown, the side walls 61 can be ribbed. This ribbing can be defined by ribbing pre-formed in the cover (as seen in FIG. 2) or by the molding process. The layer 60 includes a generally planar surface 62 and the raised circles or rims 24 which extend above the surface 62. A membrane 63 is formed in each rim 24 to close the ring. The membrane 63, which is positioned below the top edge of the rim 24 defines the surface of the button 16. The membrane surface 62 and button surface 63 both have a thickness which is equal to, or less than, the height of insignia 18, 20 and 22 so that the insignia will be exposed and visible through the membrane layer 60. However, the layer 60 has a thickness that is less than or equal to the height of the shoulder 50, such that the top surface of the layer 60 will not extend above the top of the shoulder 50 or frame 48. If the rim or frame 48 extends above the top surface of the layer 60, then the rim or frame 48 will provide additional protection from inadvertent activation of the buttons 16, for example, when the unit is dropped or when something is dropped on the unit.

Figure 4:
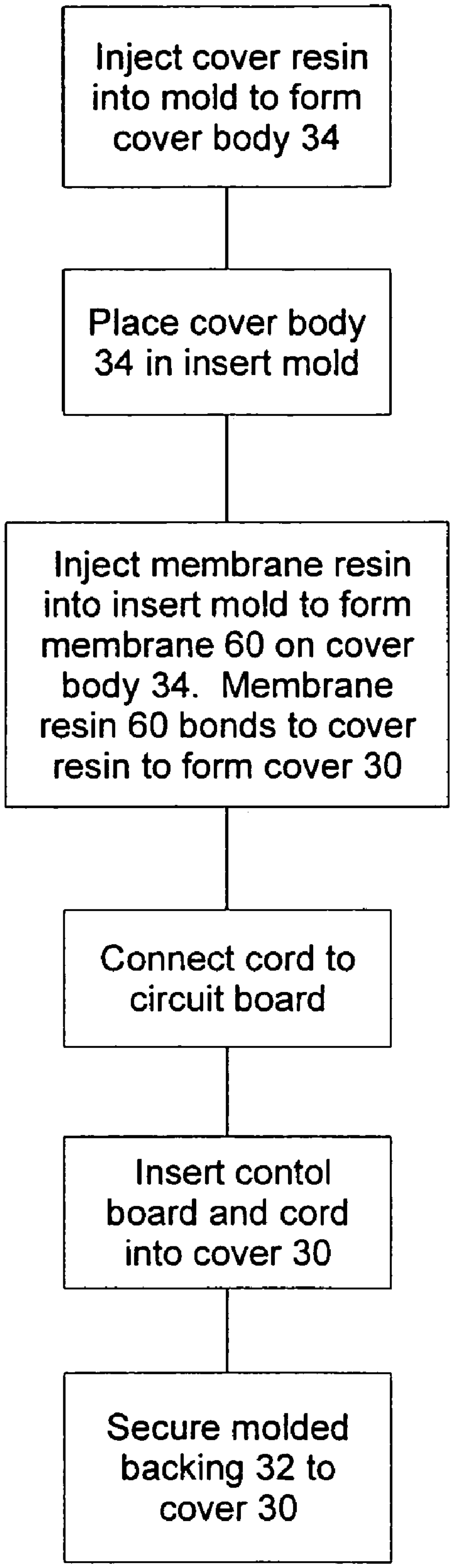
FIG. 4 is a flow chart of the manufacturing process for the pendant of FIG. 1.

The method of producing the pendant 10 is shown in FIG. 4. To form the housing cover 30, the body 34 is initially molded, for example, by injection molding from a rigid plastic producing resin, such as ABS. The cover body 34 is then placed in an insert mold where a soft plastic producing resin (for example TPE) is injected to form the membrane 60. After the membrane 60 and body 34 have substantially cooled, the combined assembly (which forms the cover 30) is removed from the mold. The membrane 60 and body 34 are molded so that the membrane 60 fuses or bonds to the body 34 to form a seal between the membrane and body to prevent gases, liquids, or particles from passing between the membrane and the body and contacting the control board. At a minimum the seal is formed at the periphery of the membrane, between the edge of the membrane and the inner surface of the body shoulder 50. Preferably, however, the membrane also is fused to the body surface 44 and the side edges of the insignia. Hence, the cover 30 (which comprises the membrane 60 and body 34) is effectively a one-piece unitary part of the pendant housing. The manner of performing such molding, whereby two resins are fused, is well known to those skilled in the art and will not be described in detail herein. To facilitate fusing of the membrane resin to the cover body resin, the step of injecting the membrane resin into the mold occurs before the cover body 34 is fully cooled.

The membrane resin is injected into membrane insert mold to fill sunken central section 46 to a depth that is equal to, or slightly less than, the height of the insignia 18, 20, and 22. The button defining rims 24 have a height, such that the top surface of the rings 24 are below the top surface of the body peripheral portion 48, as best seen in FIG. 3. The TPE resin for the membrane 60 is injected into the membrane cavity at a temperature such that the TPE resin will properly bond or fuse with the resin used for the cover body 34. The TPE membrane resin fuses to the ABS or hard plastic which forms the cover body 34. Thus, in the cover 30, there are no gaps or crevices around the buttons, such as occurs in presently available control pendants, through which contaminants can enter the cavity of the control unit.

Once the cover 30 has been molded, the control board CB is positioned in the cover cavity, or on the housing backing 32. As can be appreciated, the switches S will align with the openings 52 in the rigid body 34 and the rings 24 in the cover layer 60. The backing 32 is then secured to the back of the body 34 to close the cavity and seal the control board CB within the housing. The backing 32 can be secured to the cover 30 in any number of desired ways. For example, the backing, as shown, includes a plurality of pegs 70. These pegs can be received in openings in the bottom of the body walls 36, 38, and 40. The pegs 70 can be secured in the openings by any number of conventional methods. For example, screws, glue, press fits, or click fits can be used to secure the pegs 70 (and hence the back cover 32) to the cover body 34. Alternatively, the two parts can be welded together, for example by heat welding or vibration (or ultrasonic) welding, or they could be screwed together. Further, the control board CB can be provided with a plurality of locator holes or slots 72 which line up with the openings in the cover body 34 and through which the back cover pegs 70 extend.

An additional backing (or covering) can be molded in place to encase the entire assembly (i.e. the cover 30 and backing 32 with the control board CB, and the end of the cord 28) to provide a fully encapsulated unit. In such a fully encapsulated pendant, the control board will be fully protected from any liquid, gas, or particulate matter with which the housing may come into contact. Whether or not the unit is fully encapsulated, the unit can be easily cleaned without fear of agents contacting the control board or otherwise entering the control board cavity. This is due to the fact that, at a minimum, the membrane 60 seals the front of the unit and prevents contaminants from entering the cavity which houses the control board. Additionally, the membrane 60 provides for a substantially continuous and smooth surface. Hence, there are no crevices or sharp corners in which particulate matter can collect. Thus, the unit can be easily wiped clean, and all contaminants that might be on the surface of the can be substantially removed from the surface of the unit.

Because the membrane 60 is applied to the housing body 34, the membrane 60 can be in a color different from the housing body 34. Hence, the membrane 60 can be in a color that is different from (and contrasts with) the color of the insignia 18, 20 and 22. This will make it easier to see the insignia on the front face 14 of the pendant 10. Because the insignia 18, 20 and 22 are molded into the cover body, rather than printed on the front face of the pendant, the insignia and logo will not wear off the pendant. Additionally, the molding process allows for a thinner unit than can typically be provided with common currently available pendants which have buttons which pass through the front face of the pendant. For example, the control unit 10 can have a thickness of about 0.625".

Figure 5:
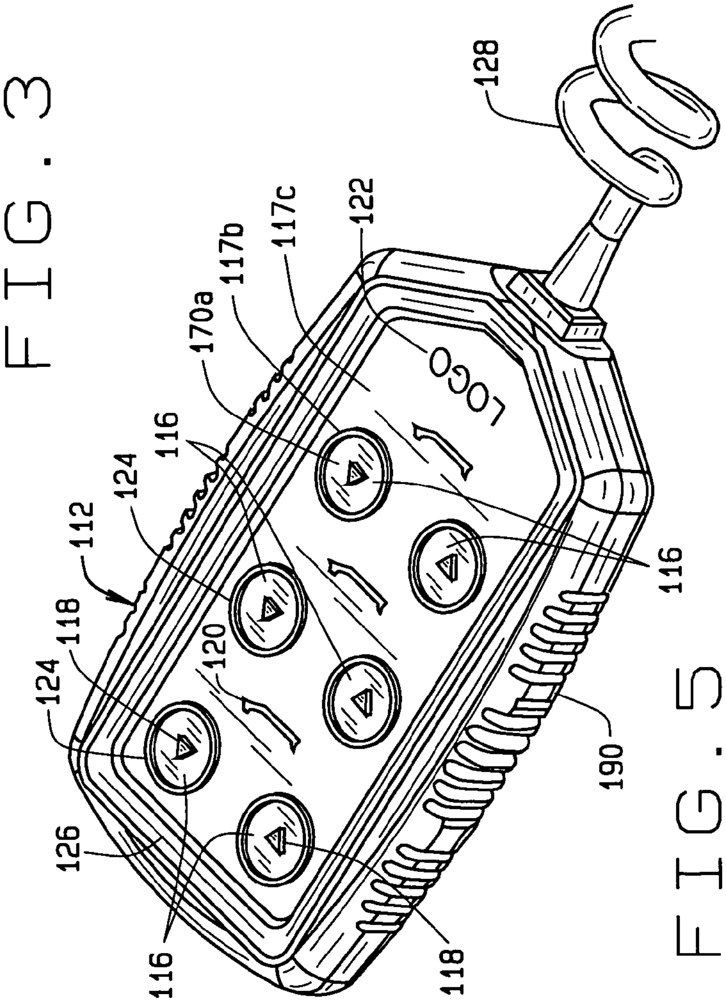
FIG. 5 is a perspective view of a second illustrative embodiment of the pendant of the present invention.
Figure 6:
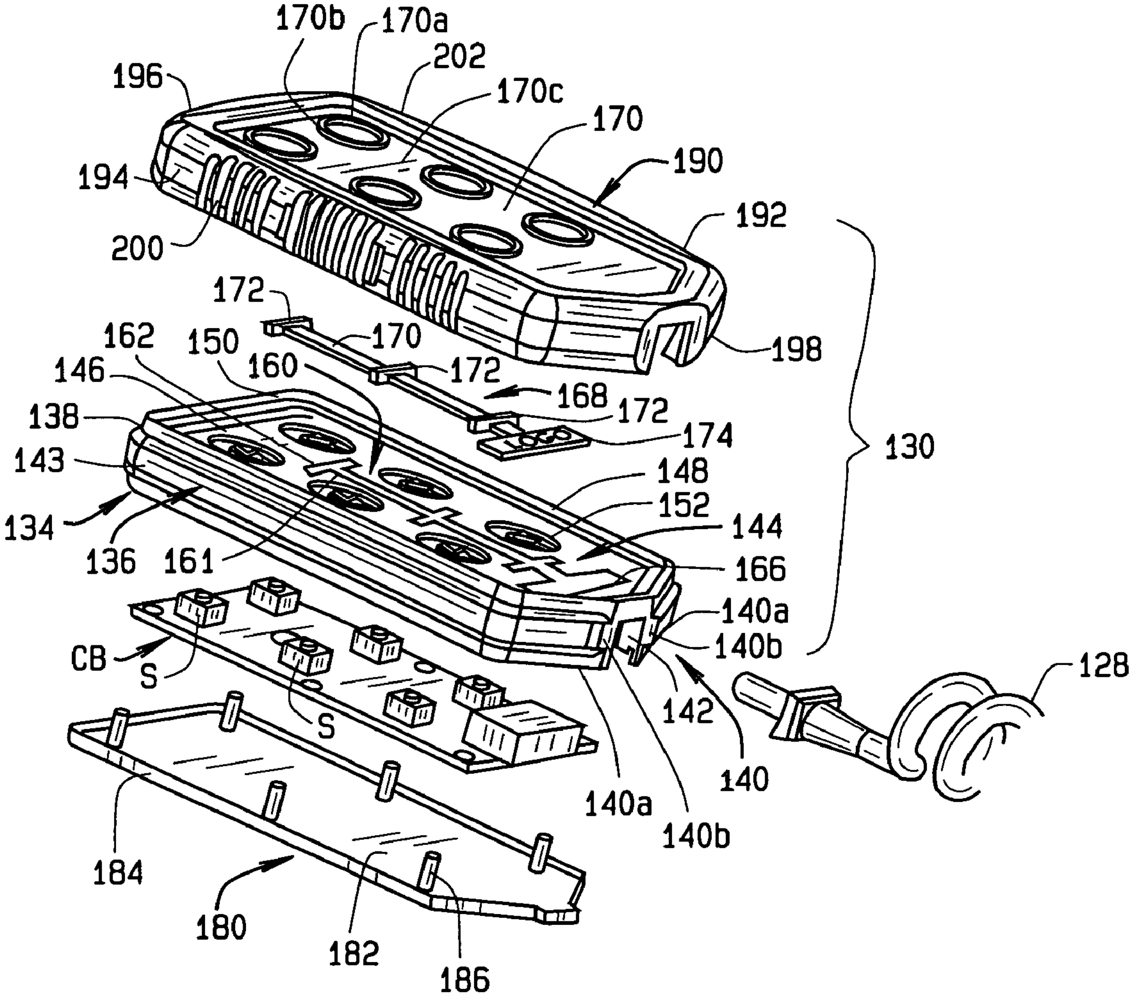
FIG. 6 is an exploded view of the pendant of FIG. 5.
Figure 7:
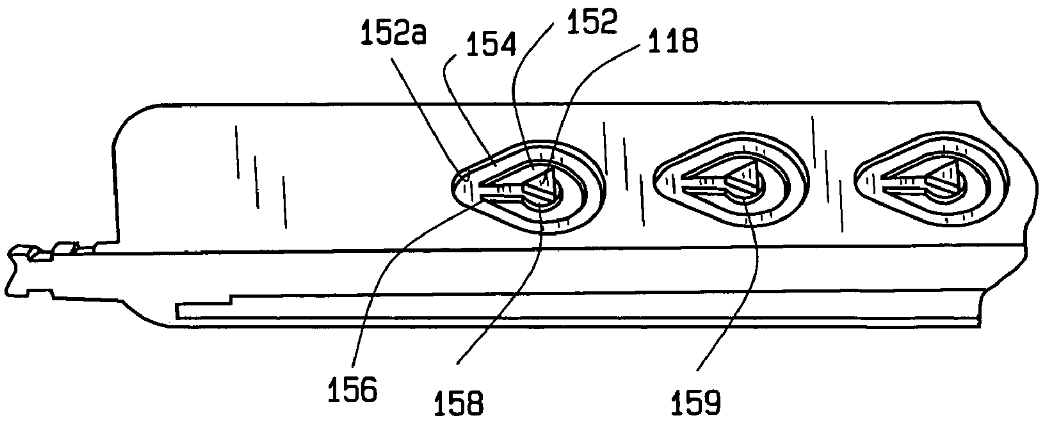
FIG. 7 is a cross-sectional view of the pendant of FIG. 5, prior to applying a casing to the pendant.
Figure 8:
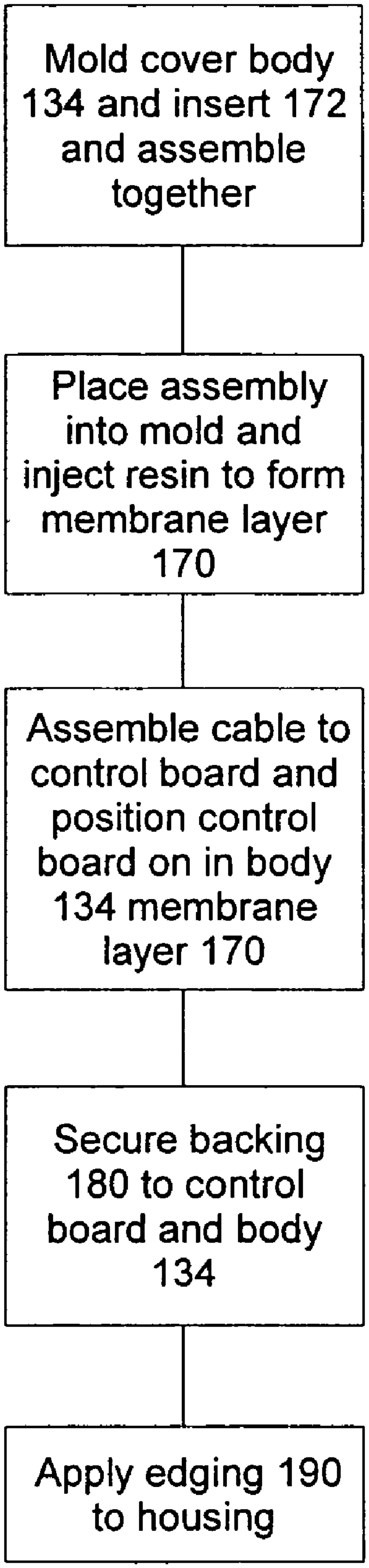
FIG. 8 is a flow chart of the manufacturing process for the pendant of FIG. 5.

A second embodiment of the pendant is shown in FIGS. 5–7. The pendant 110 includes a housing 112 having a front face 114, a back, and side walls which define a cavity in which a control board CB (FIG. 6) is mounted. The pendant includes a series of buttons 116 on the front face 114. First instructional insignia 118 in the form of up and down arrows is provided on each button 116 and second instructional insignia 120 is provided adjacent each set of buttons to indicate the function of the button. Additionally, an identifying insignia 122 can be provided which includes a logo, trademark, or the like which identifies the pendant. The buttons 116 can each include a raised rim 124 around the circumference of the button. Such a rim makes it easier, for example, to locate the buttons in dim light and for physically impaired patients to locate the buttons and reduces the possibility of accidental activation of the unit, for example, when the unit is dropped or when something is dropped on the unit. Additionally, a raised frame section 126 (FIG. 5) surrounds the front face 114 and the buttons 116. The raised frame 126 also prevents inadvertent activation of the buttons due to dropping of the pendant or something falling on the pendant. Preferably, the button rims 124 do not extend above the top of the frame 126. Lastly, if the pendant is wired (as opposed to cordless or wireless), a cord 128 extends from the bottom of the housing 112. The cord carries wires, which as is known, serve to electrically connect the control board CB the controlled equipment (in this case, a hospital bed) so that the buttons are operative to control the motors which alter the position of the bed. As with the pendant 10, the pendant 110 can be a cordless or wireless pendant The pendant housing comprises a cover 130 and a backing or bottom 180 which, when assembled together, form a cavity which receives the control board CB.

The cover 130 includes a rigid body 134 which is molded from a plastic such as ABS (acrylonitrile butadiene styrene). Other plastics will work as well. The body 134 includes side walls 136, a top end wall 138, and a bottom end wall 140. The end wall 140 is made with sloped sections 140*a* which are joined by a flat section 140*b*. An opening 142 is molded into the end wall section 140*b* for the end of the cord 128. A raised rail 143 is shown to extend along the side walls 136 and the top and bottom end walls 138 and 140.

The cover body 134 includes a front surface 144 having a central section 146 and a peripheral section or frame 148. The central section 146 is sunken with respect to the peripheral section 148, and a shoulder 150 is formed between the central and peripheral sections of the front surface 144. The control board CB includes a series of switches S. The body 134 includes a series of openings 152 in the front face which align with the control board switches S. As seen in FIG. 7, the openings 152 are tear-drop shaped. However, the openings 152 can be formed to have other shapes, if desired. For example, and without limitation, the openings 152 could be round, rectangular, square, diamond shaped, oval, etc. The openings 152 each include a peripheral shoulder 154 that extends inwardly from the edge of the opening 152, and forms a surface which is spaced slightly below the surface 144 of the central section 146. A flexible arm 156 extends from the edge of the opening 152. The arm 156 has an upper surface that lies in the same plane as the surface of the shoulder 154 (i.e., the upper surface of the arm is level with the upper surface of the shoulder 154 and is spaced below the body surface 144). A disc 158 is formed at the free end of the arm, and the operating insignia 118 is formed on the disc. The disc 158 has an upper surface which also lies in the same plane as the arm 156 and the shoulder 154. The operating insignia 118 extends upwardly from the disc 158 such that the top surface of the insignia 118 lies in the same plane as the central section 146 of the body's front surface 144. That is, the insignia 118 has a depth approximately equal to the depth of the shoulder 154. As will be described below, the sunken disc 158 in the opening 152 with the raised insignia 118 allows for resin to fill the hole 152 and surround the insignia 118 (without covering the insignia 118) to form the buttons 116 of the pendant.

Additionally, a small peg 159 extends downwardly from the bottom of the disc 158. The peg 159 is positioned on the disc 158 to be aligned with the switches S of the control board CB when the pendant is assembled. As can be appreciated, the pegs 159 contact the switches S to activate the switches. The flexible arm 156 is sized such that the disc 158 and hence the insignia 118 are positioned at the approximate center of a circle defined by the radius of the base of the opening 152.

As shown in FIG. 6, a channel 160 in the form of a slot extends along the center of the front face central section 146 from a point approximately mid-way between the first and middle row of openings 152 to a point below the bottom or third row of openings. Although the channel 160 is shown to pass fully through the cover body surface 144, it need not do so. The channel 160 could, alternatively, be formed as a groove in the body surface 144. The channel 160 includes a longitudinal channel 161 and three cross-channels 162—one at the top of the channel 161, one below the middle or second row of buttons, and one below the last or third row of buttons. The longitudinal channel 161 extends below the last cross-channel 162, and opens into a rectangular opening 166.

A indicator insert 168 is sized and shaped to be received in the channel 160. The insert 168 includes a central arm 170 sized to be received in the longitudinal channel 161. Three cross-arms 172 are sized and positioned to be received in the three cross-channels 162, and a bottom portion 174 is positioned at the bottom of the central arm 170 and is sized and shaped to be received in the rectangular opening 166 at the base of the longitudinal channel 161. The insignia 120 and 122 are molded onto the three cross-arms 172 and the bottom portion 174, respectively, of the insert 168. The insert's central arm 170, the cross-arms 172, and the bottom portion 174 all have a surface which, when the insert 168 is positioned in the channel 160, is substantially flush with the top surface 144 of the front face central section 146. The channel 160 does not extend completely through the body surface 146 and thus includes a floor (not shown) which supports the insert 168. Preferably, the insert 168 is temporarily held in place in the channel, for example, using glue, until the membrane layer is applied to the body. As noted, the insignia 120 and 122 are molded onto the respective portions of the insert 168, and are raised relative to the top surface of the insert. Hence, the insignia 120 and 122 will extend above the top surface of the 144 of the front face central section 146. As with the insignia 118, the insignia 120 and 122 doe not extend above the top of the shoulder 150.

The use of the channel 160 and the insert 168 allows for the second operating insignia 120 and the identifying insignia 122 to be formed in a color different from the first instructional insignia 118, and the housing members 134 and 190. However, is described below in conjunction with FIG. 10, the slot 160 and insignia insert 168 can be omitted, and the insignia 120 can be molded with the same part which includes the insignia 118.

The body 134 is preferably injection molded in a mold having a top portion and a bottom portion, which, in combination, form a cavity in the shape of the body 134. As can be appreciated, the body 134 is formed by assembling the mold top and bottom portions together, and injecting the body resin into the cavity. The body 134 is formed from a rigid plastic forming resin, such as ABS. Other resins which form rigid plastic are also acceptable.

After the body 134 is formed (i.e., after the insignia insert 168 has been inserted in the channel 160), a membrane layer 170 (FIG. 6) is applied over the top surface of the body 134 (FIG. 6). The membrane layer 170 is molded in situ, much in the same way that membrane 60 is molded to the body 34 in the pendant 10 of FIG. 2). The membrane layer 170 is made from a soft pliable liquid proof material, such as a TPE. To mold the membrane layer 170, a top portion of the body mold is removed, leaving the body 134 in a bottom portion of the body mold. A membrane layer mold is then applied to the mold bottom. The membrane layer mold is constructed to deliver resin over the surface of the body 34 and within the basin formed by the shoulder 150. The resin fills the openings 152 in the body 134 to a depth approximately equal to the depth of the opening so that the arrows 118 remain visible to form a top surface 170*a* of the buttons 116. That is, the membrane portion 170*a* will have a thickness approximately equal to the depth of the opening 152 from the top surface 146 of the body front face. Hence, the flexible arm and disc will be covered by the TPE resin, but the insignia 118 will be exposed through the membrane. Additionally, the membrane 170 includes a rib 170*b* which encircles the arrow 118 to define the area of the button 116; and a fluid impervious layer 170*c* surrounds the ribs 170*b*. As with the membrane layer 60 of the pendant of FIGS. 1–3, the TPE resin which forms the membrane layer 170 is injected into the mold such that the TPE fuses or bonds to the resin of the body. Hence, the membrane layer 170 will be fused to the body around the perimeter of the opening 152, to the flexible arm 156, the disc 158, to the insignia 118, to the body shoulder 150. The membrane layer will also fuse to the insert 168 and the insignia 120 and 122 formed on the insert 168. Thus, the opening 152 will be fully sealed, and the top surface of the pendant will be fully sealed.

The sidewalls, end walls, and front face of the body define a cavity which receives the control board CB. The switches S are arranged in any desired pattern (for example, a 2×3 array is shown in the drawings) on the control board. The openings 152 in the body are aligned with the switches S, and the flexible arms are sized such that the discs 158, insignia 118, and pegs are above the switches. Thus, when the button 116 is pressed, as will be described below, the peg will contact the switch S to activate the switch.

The rear cover 180 (which is preferably a molded part) is secured to the back of the body 134 to close the cavity and seal the control board CB within the housing. As with the cover body 134, the rear cover or backing 180 is preferably molded from a rigid plastic. Again, ABS is an acceptable plastic. Other rigid plastics, however, are acceptable as well. The rear cover 180 is substantially similar to the rear cover 32. It includes a back panel 182, an upwardly extending lip 184 which extends around the periphery of the panel 182, and a plurality of locator/connecting pegs 186 which extend upwardly from the panel 182.

Once the control board CB and its optional cord 128 are secured in the body 134, and the rear cover 180 is secured to the body 134 in the same manner as discussed above with the pendant 10. The cover is sized, such that the cover lip 182 extends upwardly along a bottom section of the body walls 136, 138, and 140. The lip 182 then engages the bottom of the rail 143.

After the cover back 180 is assembled the body 134, a soft pliable plastic casing or edging 190 is applied to the cover/back panel assembly. The edging 190 includes a front face 192, side walls 194, a top end wall 196, and a bottom end wall 198. The side walls 194 are preferably textured. As seen, grooves or slots 200 are formed in the side walls 184 to form the texturing of the sides. The front face 192 extends over the shoulder 150 of the body and forms a raised about the button area (i.e., about membrane layer section 170*c*). At the bottom of the pendant, the edging 190 extends inwardly a sufficient distance to cover, and hence seal, the junction between housing body 134 and the rear cover 172.

The edging 190 is formed from a soft pliable plastic or rubber material. It can be formed as a separate piece, which is applied, for example by snap fitting, to the cover body and rear cover after assembly of the rear cover to the housing body. Alternatively, the casing can be molded about the cover body and rear cover. In this case, the casing resin would be injected into a mold (into which the housing body and rear cover assembly had already been inserted) at a temperature which would allow the casing resin to fuse to the housing body, rear cover, and the membrane layer. This would ensure a complete seal about the pendant, though which contaminants could not pass. If the edging is molded in place, it can be formed in the same molding step with the membrane 170.

Figure 9:
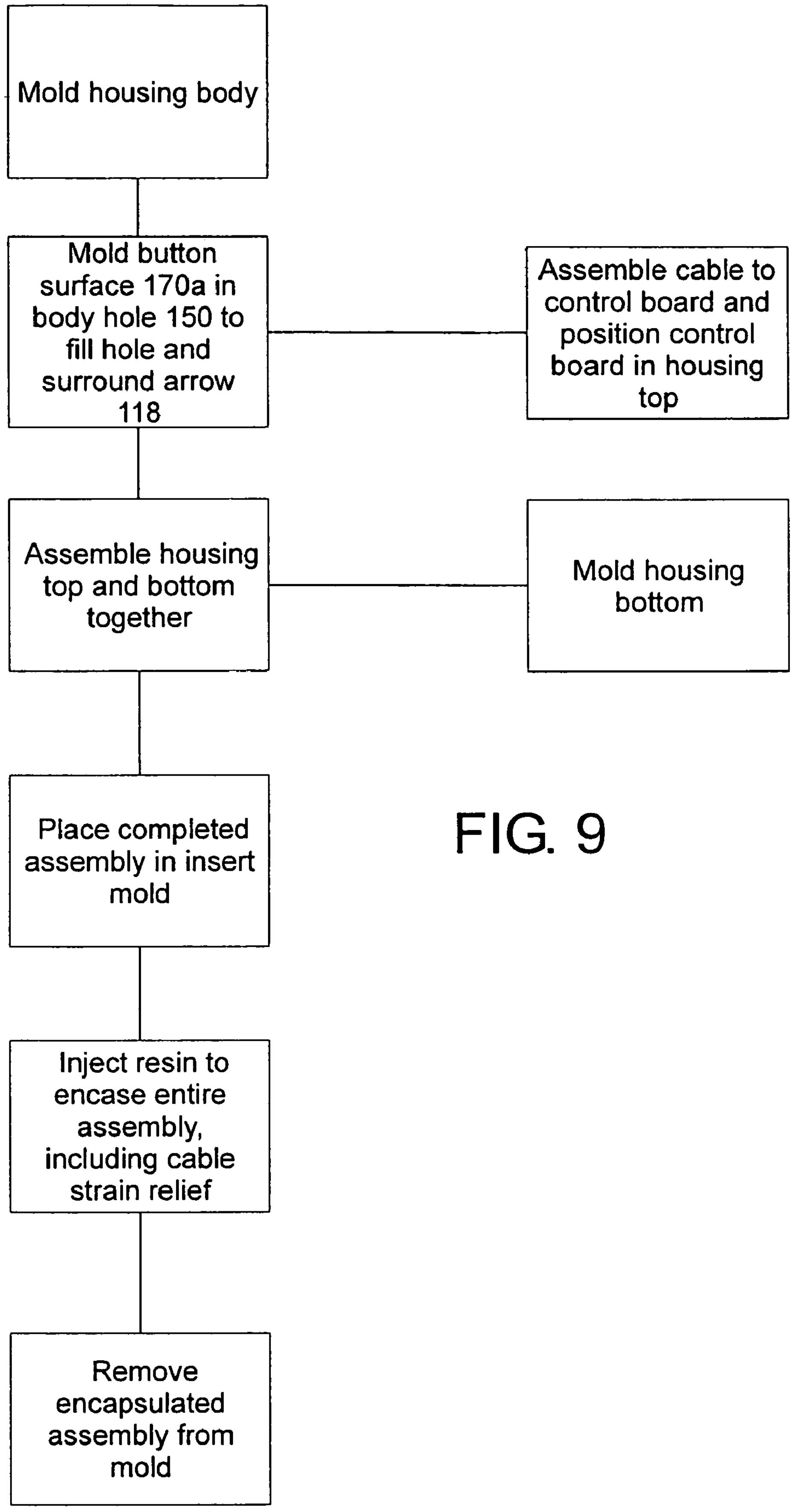
FIG. 9 is a flow chart for forming the pendant of FIG. 5 as a fully encapsulated pendant.

In FIG. 9, a flow chart is shown for forming the pendant 110 as a fully encapsulated pendant. Initially, the cover body 134 and insert 168 are formed and the insert 168 is placed in the body channel 160. The body/insert assembly is placed in a mold, and the membrane layer 170*a* is molded to fill the button holes 152, as described above, such that the membrane layer 170*a* bonds or fuses to the body 134 and such that the arrows 118 are exposed. Meanwhile, the housing bottom 180 is formed; the cable 128 is assembled to the control board CB; and the control board is positioned on the backing 180. The backing 180 (with the control board and cord) is assembled to the cover 130. The cover/backing assembly (i.e., the housing) is then placed into an insert mold where the entire assembly is encased in a soft pliable resin (such as a TPE resin). Preferably, at this step, the cable strain relief is also formed. The completed pendant is then removed from the mold. When the casing resin is injected to form the top surface of the pendant, the casing covers the body central section 146 and the insert 168. This portion of the casing is formed to have a depth less than the depth of the body peripheral frame 168 and less than or equal to the depth of the indicia 120 and 122, such that the indicia will be exposed and visible. As can be appreciated, in this method, because the encasing layer is molded in place around the cover body 134, the backing 180, and the cord 128, there will be no gap through which fluid can pass. Hence, the control board will be fully isolated from any fluid spills.

As can be appreciated, the pendant 110, as described herein, includes four different parts which are visible after the pendant has been formed: (1) the insignia 118; (2) the insignia 120 and 122; (3) the button membrane 170; and (4) the casing 190 (with the button rings 124). Hence, the pendant 110 can have upwards of four colors on the front face of the pendant. The text, graphics and colors are only limited by design requirements and imagination. Any combination of text and/or graphics can be used to provide information, instruction, or visual appeal.

Figure 10:
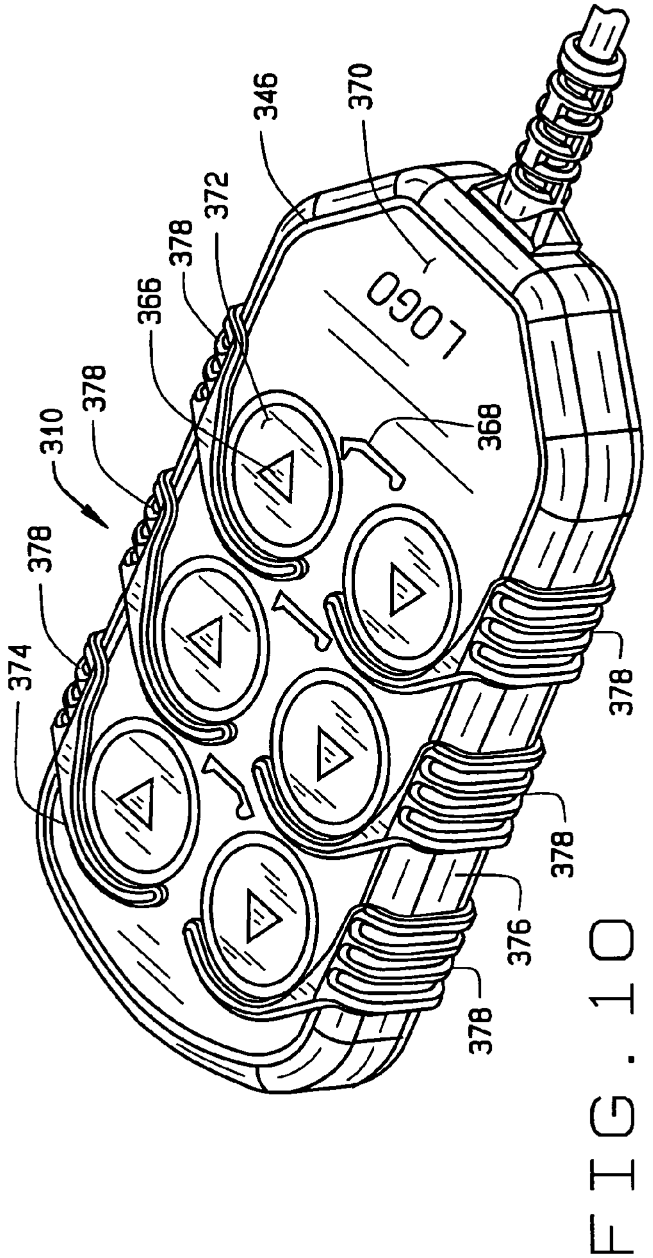
FIG. 10 is a perspective view of a third embodiment of the pendant of the present invention.
Figure 12:
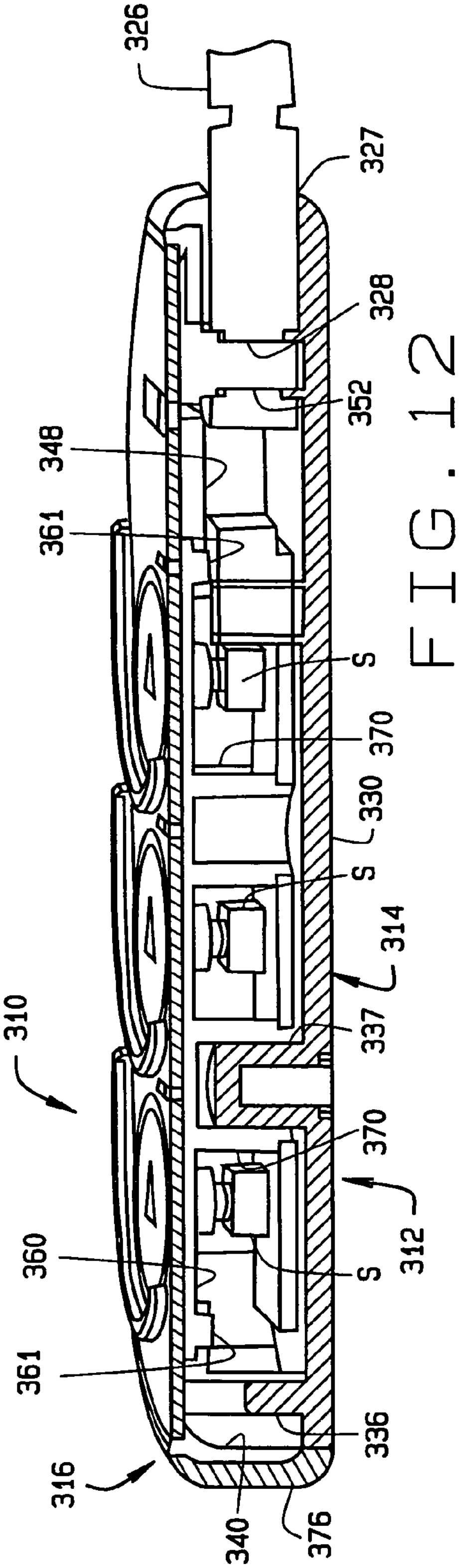
FIG. 12 is a cross-sectional view of the pendent of FIG. 10.
Figure 11:
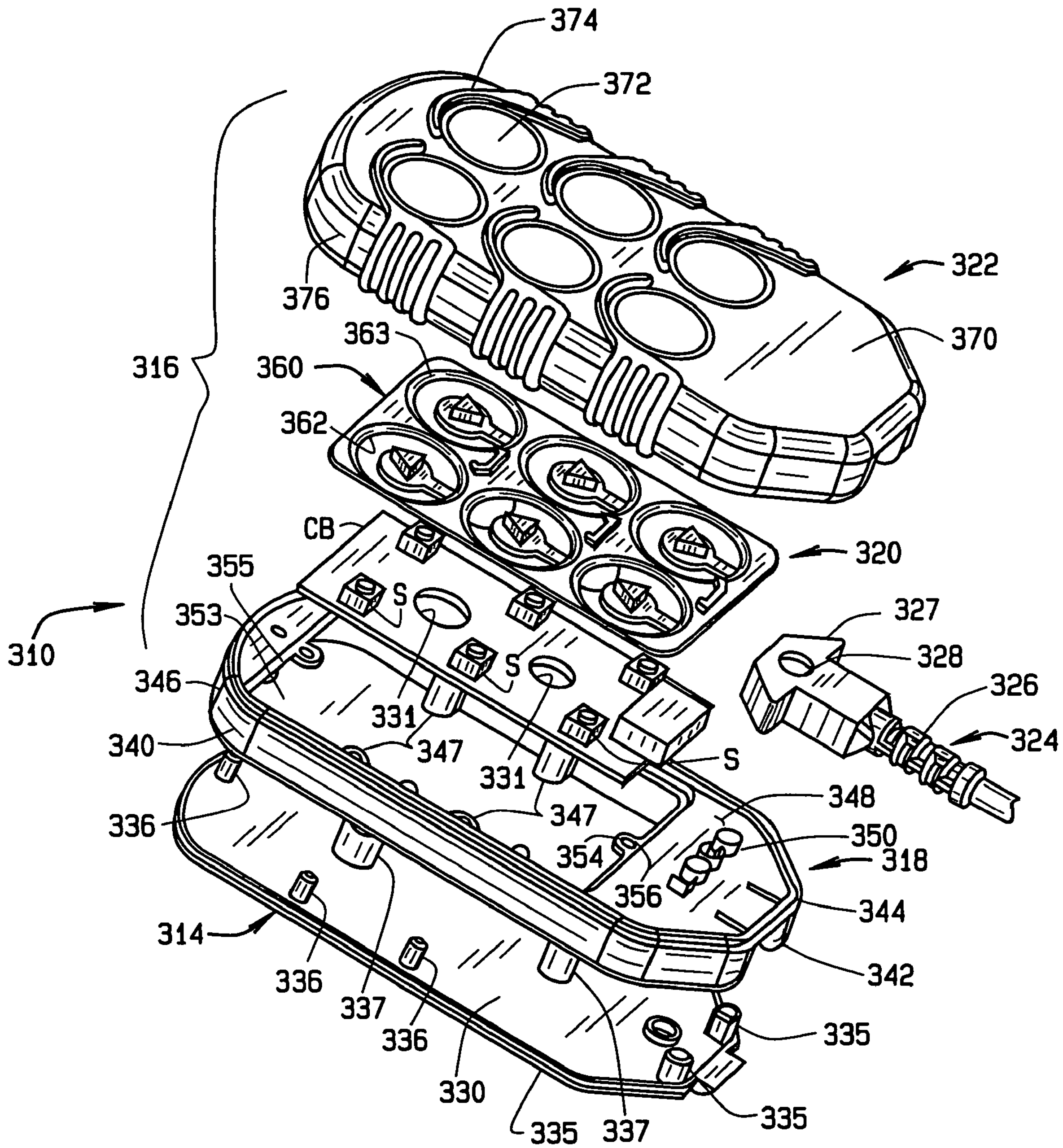
FIG. 11 is an exploded perspective view of the pendant of FIG. 10.

A third embodiment of the pendant is shown in FIGS. 10–12. The pendant 310 is generally similar to the pendant 110, however, its button layer does not include a channel to receive an insignia insert. In this embodiment, as explained below, the two operating insignia are the same color. However, the identifying insignia can be a different color.

The pendant 310 comprises a housing 312 which includes a backing or bottom 314 and a cover 316. The cover 316, in turn, comprises a body 318, a button insert or plate 320, and a casing 322. The housing 312 holds the control board CB to which the optional cord 324 is connected. The cord, as is common, includes a strain relief 326 at the junction between the cord and the housing and a head 327 from which a connector extends to mates with a receptacle on the board CB, as is known. The head 327 includes a hole 328. When the pendant is assembled, the head hole 328 is passed over an alignment pin, as will be described below.

The control board CB includes switches S which are arranged in a desired pattern. The switches are shown illustratively in a 2×3 array. The board CB also includes a pair of alignment holes 331.

The housing bottom 314 includes a back surface 330 having a slight peripheral rim 335. A pair of posts 332 are formed at its front end to receive the head 327 of the cord 324. A series of posts 336 extend upwardly from the surface 330 near the periphery or edge of the surface. A pair of posts 337 extend up from the center of the surface 330. The control board CB holes 331 which register with the posts 337 to position the control board CB relative to the housing bottom 314.

The cover body 318 includes a peripheral wall 340 which is opened at its front end, as at 342. The wall 340 has approximately the same dimensions or perimeter as the housing bottom 314. Thus, when assembled, the edge of the housing bottom is approximately flush with the outer surface of the cover body wall 340. The body wall 340 is sized to mate with the bottom rim 335. That is, the bottom edge of the cover body wall 340 will rest on the upper edge of the housing bottom rim 335. The opening 342 at the front end of the body wall is sized and shaped to mate with the base of the cord head 327. As can be appreciated, the bottom posts 332 and the cover wall opening 342 are in register with each other, and in combination, define a hole through which the cord strain relief extends.

A rib 344 extends from the top edge of the cover wall 340 to define a small external shoulder 346. A panel 348 is formed at the base of the wall 340 and extends rearwardly a short distance from the front of the body 318. Preferably, the upper surface of the panel is below the level of the rib 344. Identifying insignia 350, such as a manufacturer name, logo, etc., is formed on the top surface of the panel 348. A hollow post 352 extends down from the bottom of the panel and passes through the hole 328 in the cord head 327 to secure the cord in the pendant when the pendant is assembled. The body 318 additionally includes a series of posts 347 with openings in the upper and lower surfaces.

The panel 348 and the body wall 340, in conjunction, define an opening 353. The periphery of the opening 353 is provided with a small shoulder 355 that is below the level of the panel. Flat arms 354 having locating holes 356 extend from opposite edges of the opening periphery. The upper surface of the shoulder 355 is approximately co-planar with the upper surface of the arm 354. The arm 354 and shoulder 358 form a surface upon which the button insert or plate 320 sits.

Figure 13:
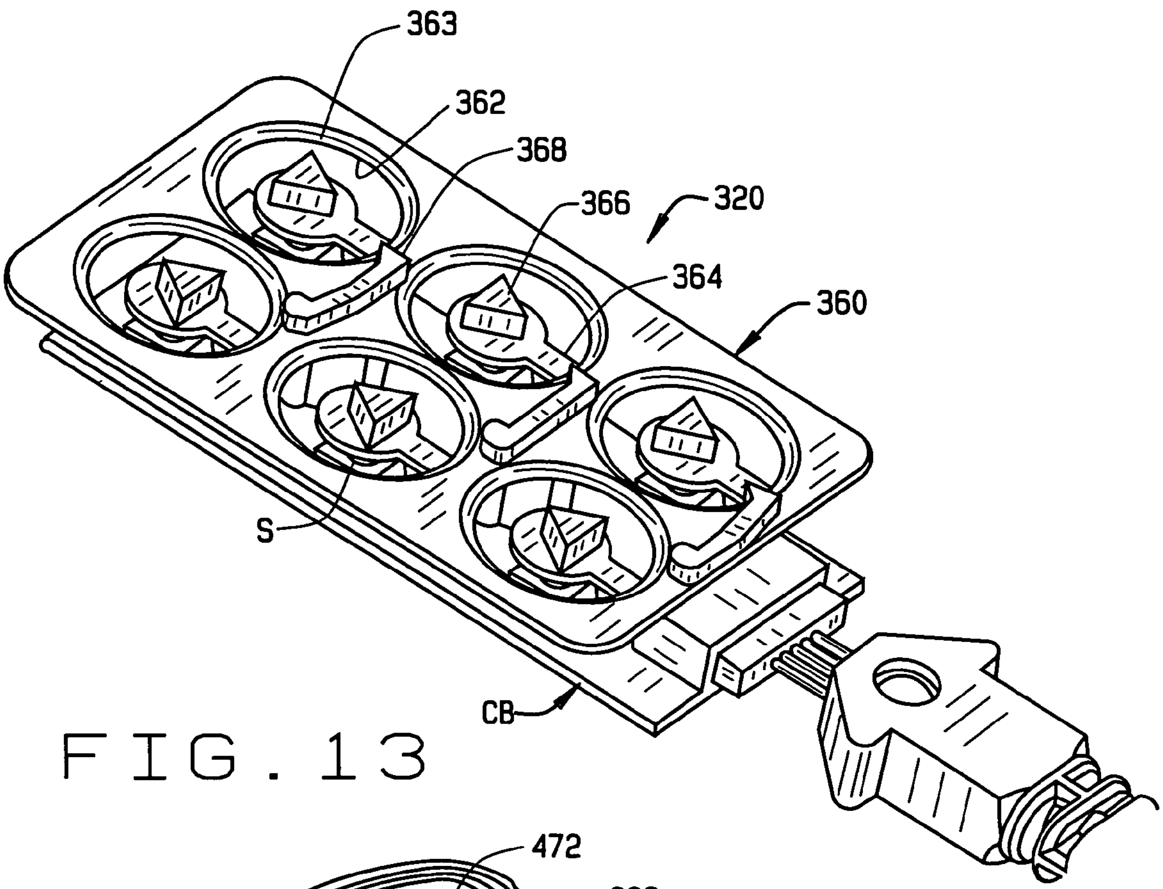
FIG. 13 is an enlarged perspective view of a button plate, control board and electrical cord used with the pendant.

The button insert 320 includes an insert board 360 (shown most clearly in FIG. 13) which is sized and shaped to be received on the shoulder 358 and arm 354 of the cover body 318. The insert board 360 has a depth approximately equal to the depth of the shoulder 355. Hence, when the button insert 320 is positioned in the cover body 318, the top surfaces of the board 360 and panel 348 will be substantially level relative to each other. A series of alignment pins 361 (FIG. 12) extend from the bottom of the board 360 to be received in the holes 356 of the arms 354 and in the openings of the posts 347. Holes 362 are formed in the insert board 360 in a pattern and position to be aligned with the switches S of the control board GB. The holes or openings 362 are shown to be circular, but could be formed in any desired shape. The edge 363 pf the openings 362 is preferably slightly beveled or sloped, but can be straight. A flexible arm 364 extends from the edge of the opening, and an insignia 366 (shown in the shape of an arrow) is formed at the end of the arm. The arm 364 is sized such that the insignia 366 is above the control board switch S, such that when the insignia is pressed, it will contact and activate its respective switch. The arms 364 have a depth less than the depth of the board 360. The insignia 366, on the other hand, have a depth that is at least as deep as the board, such that the top surface of the insignia are at least even with the upper surface of the board. Preferably, the insignia 366 have a height, such that, when the button insert 320 is placed in the body 318, the upper surface of the insignia 366 is approximately level with the upper surface of the shoulder 346. Function insignia 368 (i.e., the bed positioning) is shown positioned between the two rows of openings 362. The function insignia 368 are shown to be raised above the top surface of the board 360, and to have a height, such that the top surface of the insignia 366 is about level with the top surface of the insignia 368.

The button insert 320 also includes a pair of locating posts 332 which are positioned to receive the alignment holes 331 of the control board CB. The posts 332 are hollow, and at least one of the posts 332 is also positioned to slide over the alignment pin 337 in the housing bottom or backing 314.

The backing 314, cover body 318, and the button insert 320 are all made from a rigid plastic, such as a ABS. The casing 322, on the other hand, is made from a softer and pliable plastic, such as a TPE. The casing 322 can be formed separately, and then applied to the cover/bottom assembly. However, it is preferably molded about the cover/bottom assembly after the control board and cord have been positioned in the bottom and after the bottom has been secured to the cover body, for example using screws. As noted above, screws need not be used to fix the housing bottom to the cover. Any other conventional means, such as welding, gluing, snap fit, etc., can also be used to secure the housing cover and bottom together. When molded about the cover/bottom assembly, the casing is molded in a manner which will allow the casing resin to fuse or bond with the resin of the cover and bottom. This will better ensure that there are no gaps through which liquids can pass.

The casing 322 includes a top surface 370 on which button surfaces 372 are formed. The button surfaces 372 are formed as described above in conjunction with the pendant 110. During molding, the resin fills the holes 362 of the button plate 320, surrounding the arrows 366, but leaving at least the top surface of the arrows exposed, so that the arrows are visible. The mold then allows the resin to fill in the area defined by the cover wall 340 to a depth at which the function insignia 368 and the identifying insignia remain visible. If desired, the upper edge of the shoulder 346 could also be visible. As can also be seen, raised semi-circular ridges 374 are provided around at least a portion of the perimeter of the button surface 372. As can be appreciated, the ridges 374 facilitate locating the buttons. Additionally, as noted above, such raised areas help isolate the buttons somewhat, to prevent accidental activation of the button should the pendant be dropped or if something should fall on the pendant. The casing 310 also includes side surface 376 which extend down the side walls 340 of the cover body. As seen in FIG. 12, the casing side surface 376 extends downwardly to cover the outer or peripheral edge of the housing bottom 314. Hence, any gap between the housing bottom 314 and the body side wall 340 will be sealed by the casing side surface 376. Textured gripping areas 378 can also be provided to make holding of the pendant more comfortable. Although the gripping areas 378 and the locating ridges 374 are shown in a particular pattern or design, any desired pattern or design can be used.

The cover 316 of the pendant 310 includes three portions—the body 318 (which includes the identifying insignia 350 and the rim 346), the button insert 320 (which includes the arrows 366 and function insignia 368), and the casing 322. Hence, once made, the pendant can be formed from three different colors, if desired. The main color would be the color of the casing. However, the color of the various insignia would show through. Preferably, the insignia are formed in colors that will contrast with the color of the casing to make the insignia easier to see and read or interpret.

Figure 14:
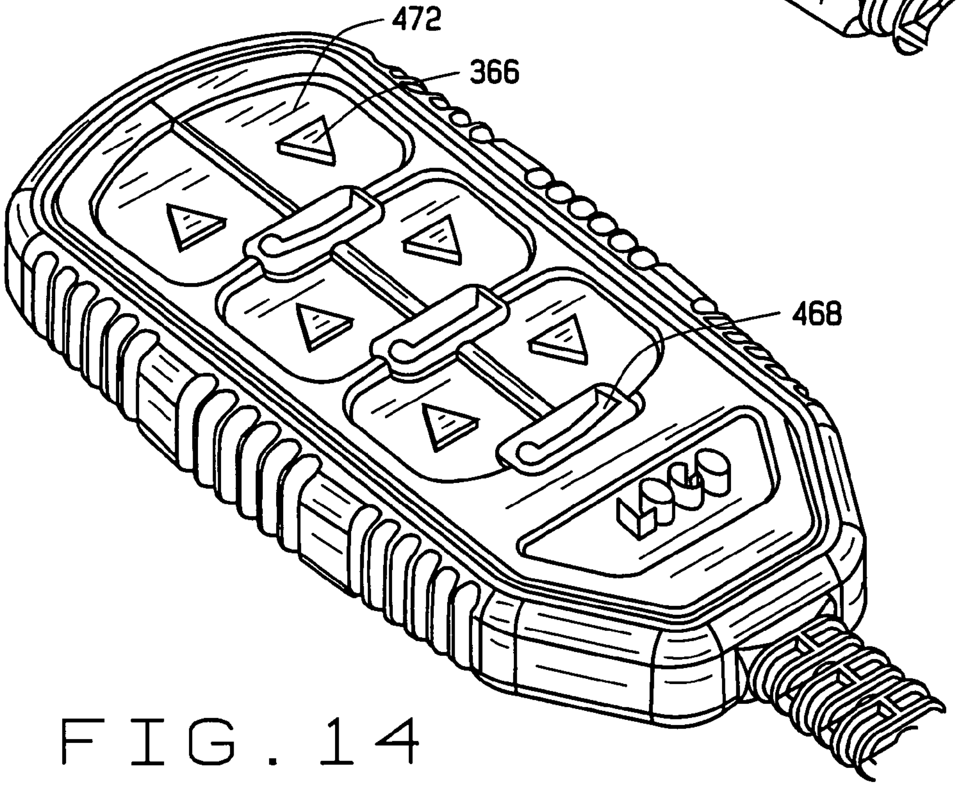
FIG. 14 is a perspective view of a fourth embodiment of the pendant of the present invention.
Figure 15:
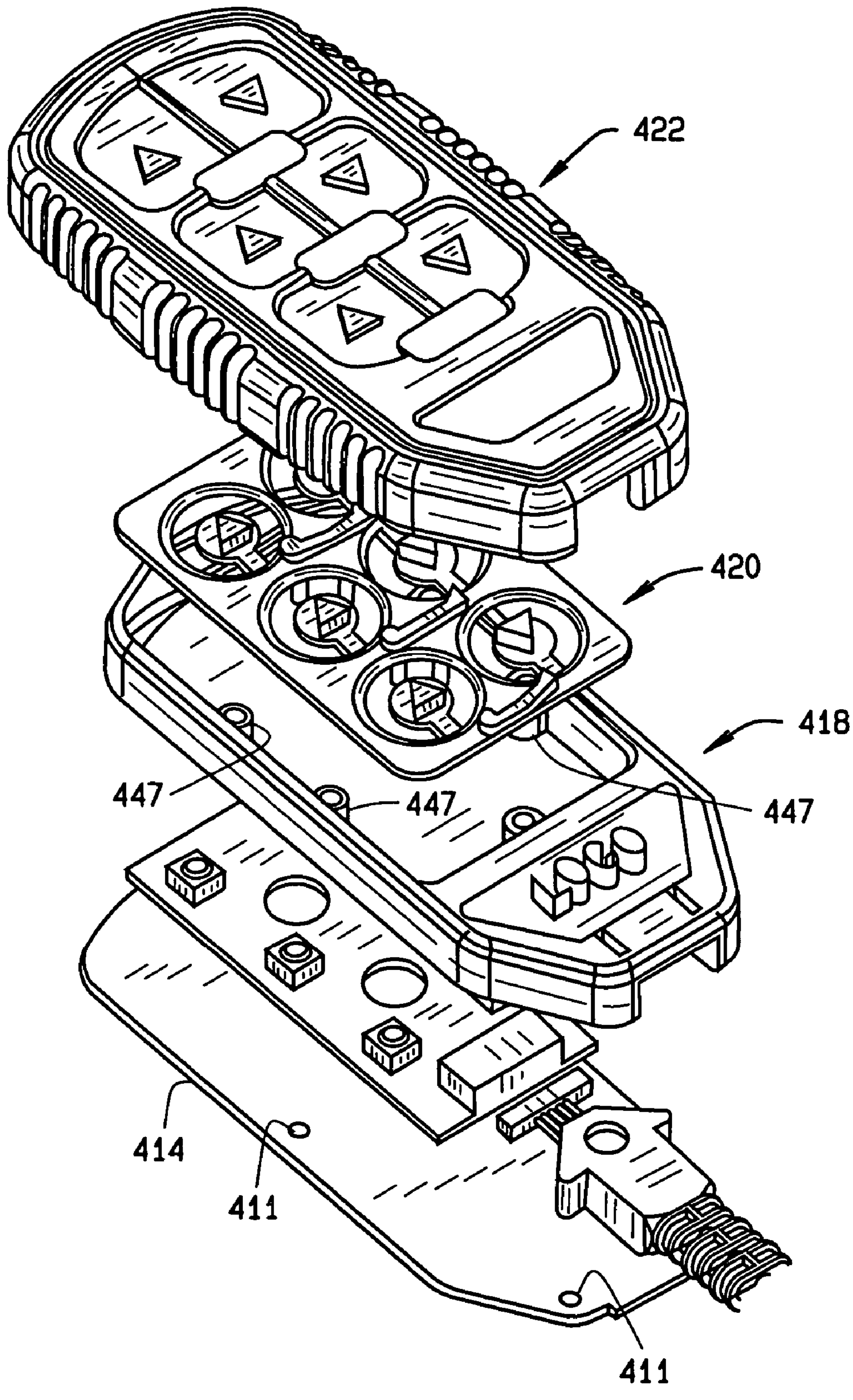
FIG. 15 is an exploded perspective view of the pendant of FIG. 14.
Figure 16:
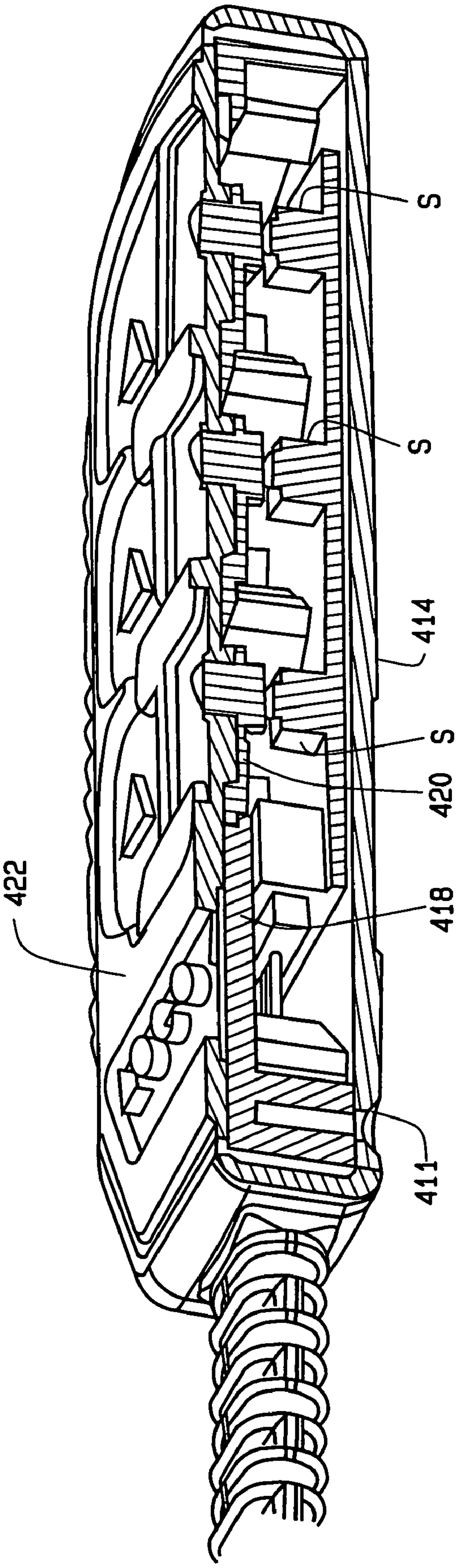
FIG. 16 is a cross-sectional view of the pendent of FIG. 14.

A fourth embodiment 410 is shown in FIGS. 14–16. The pendant 410 is substantially similar to the pendant 310 of FIG. 10, except that its casing 422 provides a different appearance. The pendant 410 includes a backing 414, a cover body 418, a button plate 420, and the casing 422. The backing 414, cover body 418, and button plate 420 are substantially identical to the counterparts of pendant 310. However, the screw holes 411 in the backing 414 are shown in FIG. 15. The screw holes receive screws that are screwed into the bottom holes in the posts 447 of the housing body 418.

Turning to FIG. 14, the casing is molded to provide a sunken button area 472 around each insignia. The up and down arrows (or button areas) are separated by a ridge. The function insignia 468 is on a raised platform.

As can be appreciated, we have provided pendants 10, 110, and 310 which are substantially sealed so that contaminants cannot enter the housing. Further, the various insignia are molded in the body (or in a body insert) rather then printed on the top surface of the pedant. Hence, the insignia will not fade or wear off with use. Additionally, because the pendant housing cover is molded in two or more steps, the cover can incorporate two, three, four, or more different colors. Because the button surfaces are molded into the cover body, the overall depth of the housing can be reduced. Thus, the pendant is thinner than previous pendants, making the pendant of the present invention easier to hold. The use of the soft plastic surrounding the rigid plastic also provides for a soft feel to the pendant, making the pendant more comfortable to hold and operate.

As various changes could be made in the above constructions without departing from the scope of the invention, it is intended that all matter contained in the above description or shown in the accompanying drawings shall be interpreted as illustrative and not in a limiting sense. For example, in the pendant 320, the panel 348 could be omitted from the cover body 318; the button insert could be enlarged, and the identifying insignia 350 could be included on the button insert. In any of the embodiments, depending on the particular application, all three insignia may not be necessary or required. For example, if a switch is an on/off switch, function and operation insignia would not both be required—only function would be required. In some applications, it might be desirable to leave off the identifying insignia. Tinted, rather than colored, resin can be used, for example for the membranes which surround the arrows. Tinted resin is translucent, and the control can be provided, for example with LED's, which will "light up" the button membrane, making it easier to find the buttons in the dark. In lieu of LED's, the pendant can be provided with fiber optics which transmit light to the insignia and/or buttons. An alternative to providing a light source for the buttons and/or insignia, is to mold the insignia from "glow-in-the-dark" plastic. The top surface of the casing can be molded in other fashions to make locating the buttons easier or for aesthetic purposes. The cover body, button plate, and cover bottom, although described to be made of the same type of resin, could, for specific purposes be made from different resins to achieve desired results. Specifically, the button plate could be molded from a resin different from the cover body for purposes of light transmission, as noted above, or to give the insignia a specific feel. The button plate of pendants 310 or 410 could be modified to receive an insignia insert 168 of pendant 110. These examples are merely illustrative.

The invention claimed is:

1. A method of making a housing for a control board; said method comprising:

providing a housing bottom and a housing cover; said housing cover including an upper surface, a raised periphery around said upper surface; at least one button hole on said upper surface; and at least one operating insignia associated with said hole; said insignia being formed from raised characters, symbols, or designs;

molding a membrane over said surface which closes said button hole and surrounds said operating insignia without covering said insignia such that said insignia are exposed through said membrane; said molding step comprising applying a membrane resin over said surface such that said membrane resin fills the area defined by said raised periphery to a height which will not cover said operating insignia such that said operating insignia will be exposed through said membrane resin; said membrane resin being applied to said housing cover such that said membrane resin fuses at least to inner edges of said raised periphery;

positioning said control board on one of said bottom and said cover; and assembling said bottom to said cover.

2. The method of claim 1 wherein the cover includes a flexible arm extending into said button hole and having raised operating insignia at its end; said step of forming said membrane comprising filling said button hole to a level which covers said arm, but leaves at least an upper surface of said operating insignia exposed.

3. The method of claim 2 wherein said cover comprises a cover body and a button insert; said button insert including said at least one button hole; said step of providing said housing cover comprising inserting said button insert into said cover body.

4. The method of claim 3 wherein said cover additionally includes an insignia insert; said insert including second operating insignia; said method comprising a further step of assembling said insignia insert to said cover body to form said cover prior applying said membrane resin to said cover; said applying step comprising applying said membrane resin such that said second operating insignia will be at least partially exposed through said membrane.

5. The method of claim 3 wherein said method comprises forming said body cover from a first resin; forming said membrane from a second resin; and forming said button insert from a third resin.

6. The method of claim 5 wherein said first, second, and third resins are of different colors.

7. The method of claim 1 wherein said method comprises providing said cover made from a resin of a first color and forming said membrane from a resin of a resin of a second color.

* * * * *